United States Patent [19]

Orban

[11] Patent Number: 4,563,627
[45] Date of Patent: Jan. 7, 1986

[54] SWITCHING SYSTEM FOR HIGH VOLTAGE BATTERY PACK

[75] Inventor: John M. Orban, Santa Monica, Calif.

[73] Assignee: Vivitar Corporation, Santa Monica, Calif.

[21] Appl. No.: 620,027

[22] Filed: Jun. 13, 1984

[51] Int. Cl.[4] .............................................. H02J 7/00
[52] U.S. Cl. ........................................ 320/19; 320/2; 320/40
[58] Field of Search ................... 320/2, 15, 19, 39, 40; 354/145.1

[56] References Cited

U.S. PATENT DOCUMENTS 4,191,917 3/1980 Brown et al. ............................ 320/2
4,300,087 11/1981 Meisner .................................... 320/2

Primary Examiner—Peter S. Wong
Assistant Examiner—Anita M. Ault
Attorney, Agent, or Firm—Lyon & Lyon

[57] ABSTRACT

There is disclosed herein a rechargeable battery pack for use with electronic devices, such as electronic flash units used in photography, and wherein the battery pack has a pair of exposed electrical terminals. At least one of the terminals is constructed in the form of a switch such that when the battery pack is removed from its case, the terminal will assume a switched state so as to eliminate any electrical shock hazard. The battery pack comprises rechargeable batteries, a DC/DC converter for converting the relatively low voltage of the rechargeable batteries to the relatively high output voltage of the battery pack, and includes a voltage monitor and limiting circuit which provides voltage regulation and provides a low battery voltage limit during discharge of the rechargeable batteries. In a preferred embodiment, a rechargeable battery pack for providing an output of approximately 330-360 volts DC is illustrated and wherein the positive output terminal of the battery pack is connected to the negative terminal thereof through a relatively large discharge resistance to both shunt the high voltage output terminals and to turn off the voltage converter to thereby eliminate any electrical shock hazard and to provide a very slow discharge of the rechargeable batteries of the battery pack.

5 Claims, 3 Drawing Figures

U.S. Patent   Jan. 7, 1986   4,563,627
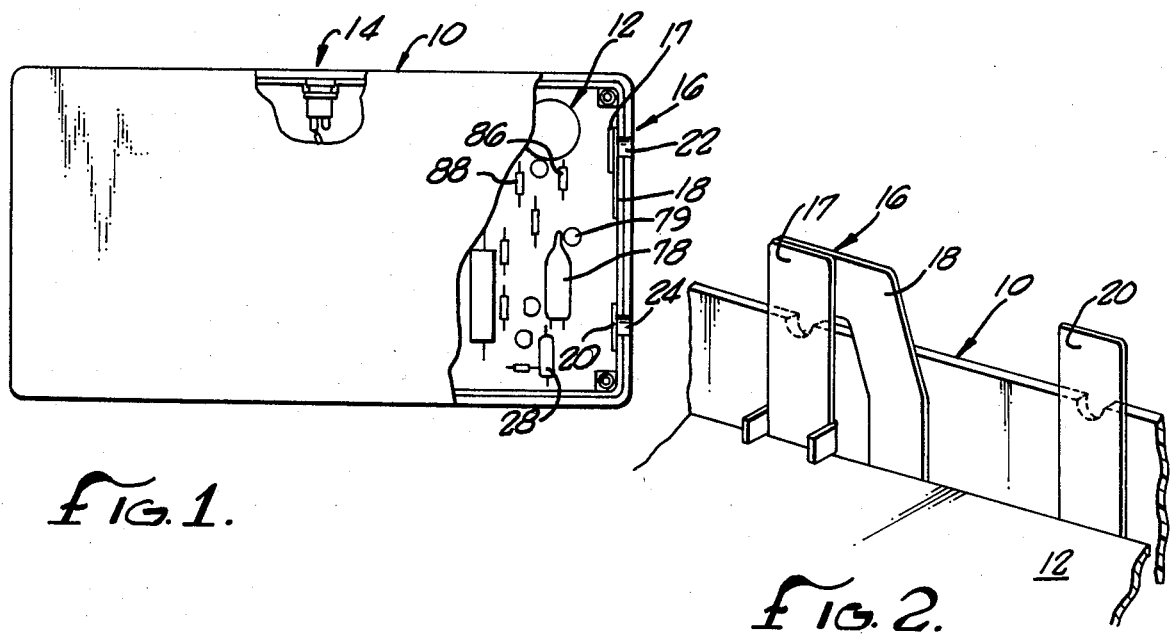
Fig. 1.
Fig. 2.
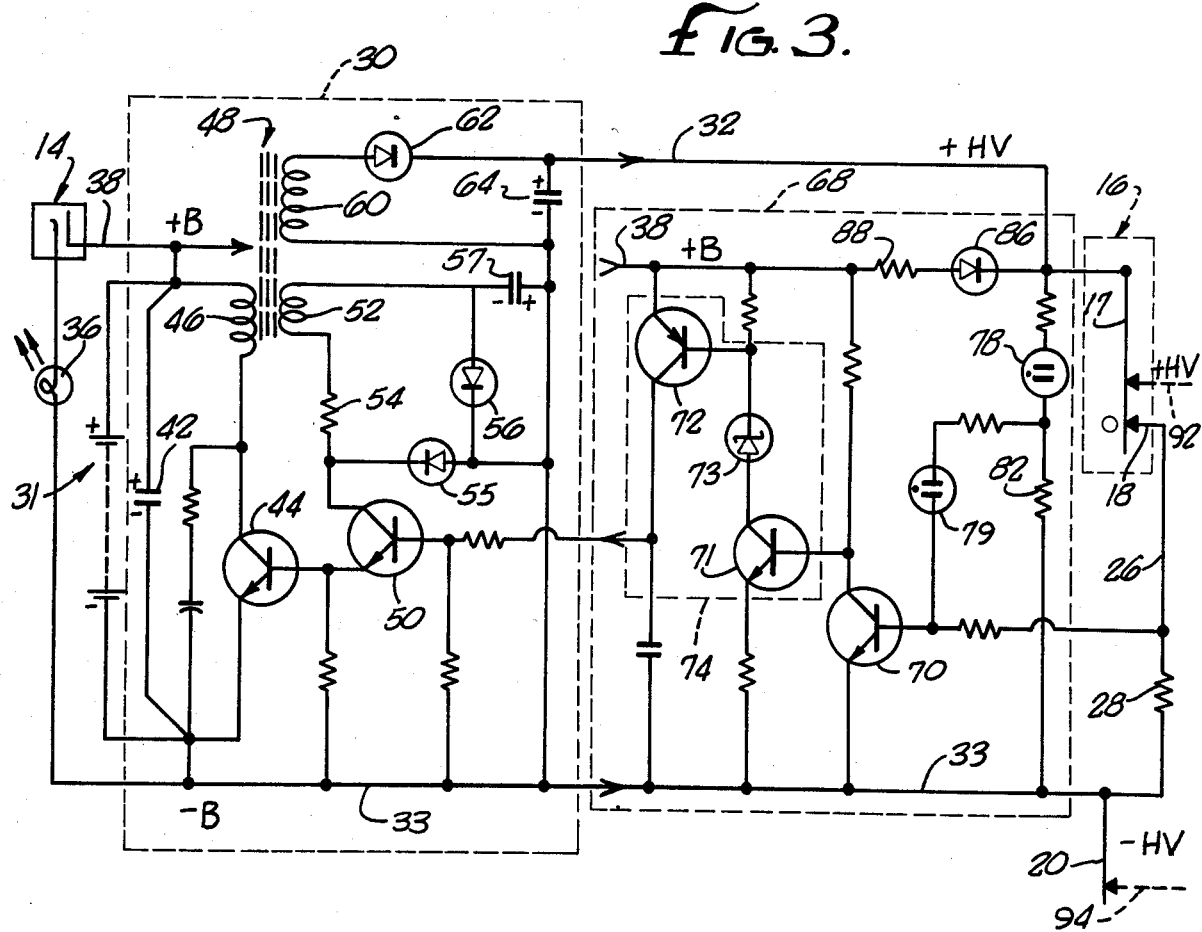
Fig. 3.

SWITCHING SYSTEM FOR HIGH VOLTAGE BATTERY PACK

BACKGROUND

The present invention relates to battery devices, and more particularly to a high voltage rechargeable battery pack having an electrical contact arrangement for eliminating a shock hazard.

Various forms of rechargeable battery packs and battery devices have been devised. A notable example is the battery and charging system for present-day electronic flash units used in the photographic field. The typical electronic flash unit includes a set of rechargeable batteries, the voltage of which is stepped up by a DC/DC converter in the flash unit to provide the relatively high (250–400 volts) voltage used for powering the flash tube of the flash unit. High voltage battery packs have been provided for such flash units (such as the Vivitar Corporation high voltage battery pack Model HVP-1) for use with electronic flash units (such as the Vivitar Model 283 electronic flash unit) so as to enable the photographer to take a large number of pictures both quickly (because the recycle time of the flash unit can be reduced through the use of the high voltage battery system) and in large numbers (because of the high capacity of the battery pack). These units employ a disposable 510 volt carbon zinc battery.

The low voltage battery systems usually incorporated within the typical electronic flash unit are quite suitable for many applications, but they may not provide a sufficiently large number of electronic flashes and fast recycle time desired by professional and semi-professional photographers. While a high voltage battery pack such as that which uses the carbon zinc battery noted above solves these problems of recycle time and number of flashes, such disposable batteries are relatively expensive.

SUMMARY

According to the present invention, a high voltage rechargeable battery pack is provided which may utilize relatively small and compact rechargeable batteries, and which can provide a relatively high voltage (such as 360 volts DC) for enabling the large number of flashes and rapid recycle time to be obtained. One of the problems in dealing with a rechargeable battery pack is the fact that the same typically is removed from the case, flash unit or connector with which it is used in conjunction with the flash unit for recharging, thereby exposing the high voltage output terminals. According to the present invention, the potential shock hazard presented by such high voltage terminals is eliminated by providing a switchable terminal such that the positive or hot terminal can be shunted to the negative or ground terminal by a relatively large resistance to both shunt the output terminals and to turn off the voltage converter to thereby take care of this problem. Additionally, this arrangement allows the batteries of the rechargeable battery pack to be very slowly discharged (e.g., such as over three-four months) to allow the life of the rechargeable batteries to be improved.

Accordingly, it is an object of the present invention to provide an improved high voltage battery pack.

Another object of this invention is to provide an improved contact terminal system for a high voltage battery pack.

These and other objects and features of the present invention will become better understood through a consideration of the following description taken in conjunction with the drawing in which:

FIG. 1 is a partially broken away plan view of the package for a high voltage battery pack according to the present invention showing the high voltage contact terminals thereof;

FIG. 2 is an enlarged fragmentary view of the contacts of the high voltage contact system; and FIG. 3 is a circuit diagram of the battery pack of the present invention.

DETAILED DESCRIPTION

A preferred embodiment of the present invention will be described for use with the Vivitar high voltage battery pack HVP-1 for use with an electronic flash unit. It should be understood that the concepts of the present invention could be used for other products and in other high voltage rechargeable battery applications.

Turning now to the drawing, FIG. 1 shows a cut-away view of a rechargeable high voltage battery pack according to the present invention which has a suitable case 10 for housing the various components of the pack, including a circuit board partially shown at 12. The case 10 is configured to be similar to the five hundred and ten volt carbon zinc battery which is used in the Vivitar high voltage battery pack HVP-1. With this configuration, the rechargeable pack shown in FIG. 1 can directly replace the carbon zinc battery in the HVP-1 for supplying high voltage to an electronic flash unit. The HVP-1 is a power pack which houses the battery (510V carbon zinc or the present rechargeable pack) and includes a voltage regulator to regulate the output voltage down (e.g., to 330V) to a suitable voltage for a flash unit.

A charging plug 14 provides an input for supplying power to the pack for recharging the batteries therein. The battery pack further includes a switching contact 16 comprising a contact terminal 17 and a switch contact 18. The contact terminal 17 preferably is the positive terminal of the battery pack, and the pack also includes a negative contact terminal 20. The contacts 17 and 18 are formed of a suitable metal and are mounted onto the circuit board 12 to be spring biased to a normally closed position. The case 10 includes openings 22 and 24 for providing access to the terminals 17 and 20. The HVP-1 has male terminals which extend into the openings 22 and 24 in order to provide physical and electrical contact with the positive electrical contact 17 and the negative contact 20. When the battery pack of FIG. 1 is engaged and connected with the HVP-1, the positive contact terminal 17 is disengaged (moved to the left as seen in FIG. 1) from the switch contact 18, and the contact 17 thus is connected with the positive terminal of the HVP-1, and the terminal 20 is connected with the negative terminal thereof as will be more readily apparent in connection with the description of the circuit diagram of FIG. 3. Thus, with the battery pack of FIG. 1 removed from the HVP-1 receptacle, the positive terminal 17 is connected with the switch contact 18 (the switch 16 is closed) which, in turn is connected through a line 26 (FIG. 3) and a resistor 28 to the negative, or ground, terminal 20 of the circuit of the battery pack. This arrangement serves the dual purpose of shunting the contacts 17 and 20 and turning off the voltage converter of the battery pack to eliminate electrical shock which could occur by the user contacting the terminals 17 and 20. It also provides a discharge path through the resistor 28, all as will become apparent in the discussion of the circuit diagram of FIG. 3.

Turning to the circuit diagram of FIG. 3, the same includes a DC/DC converter 30 connected with a series of rechargeable batteries 31 (such as eight) to provide a high voltage between a positive line 32 and a common line 33 respectively connected to the positive output terminal 17 and negative output terminal 20. The circuit also includes the input jack 14 which is connected through a charge indicator lamp 36 to a low voltage positive supply line (+B) 38 and the common line 33. The DC/DC converter 30 is an essentially conventional circuit which takes the relatively low voltage (e.g., 8.8–9.6 volts DC) of a series of rechargeable batteries 31 and converts this to a high voltage (e.g., 350 volts DC) across lines 32-33.

The converter 30 includes a decoupling capacitor 42 for filtering or smoothing the relatively high peak current spikes (e.g., twenty amps) drawn from the batteries 31. The converter 30 includes a power transistor 44 connected in series with the primary winding 46 of a transformer 48 and a control transistor 50 connected in series with a feedback winding 52 of the transformer 48. The control transistor 50 turns the converter 30 on and off based on the signal applied to the base of the transistor 50. The feedback winding 52, a resistor 54, diodes 55-56 and a capacitor 57 comprise a bias and feedback circuit for the converter. The transformer 48 has a high voltage secondary winding 60 connected with a rectifying diode 62 and a filter capacitor 64.

The circuit of FIG. 3 also has a monitor circuit 68 which includes a combined voltage regulator, comparator and amplifier comprising transistors 70-72, with the transistors 71-72 and zener diode 73 forming a low battery voltage limiter circuit 74. The monitor circuit 68 further includes an output voltage detector circuit comprising neon tubes 78 and 79 which are connected with the output terminals 17 and 20. In a system providing a 360 volt output, the neon tube 78 preferably has a 270 volt ignition voltage and a 240 volt sustaining voltage and the neon tube 79 has a 120V ignition 90V sustaining voltage. A relatively large resistance (e.g., 33 megohms) 82 is connected in series with the neon tube 78 across the output terminals 17 and 20. The neon tube 78 will turn on when the output voltage reaches 270 volts, and the difference between the output terminal voltage and the sustaining voltage (240 volts) of the neon tube 78 determines whether the second neon tube 79 turns on or not. When the output terminal voltage reaches approximately 360 volts (240 volt sustaining voltage for neon tube 78 and 120 volts ignition voltage for neon tube 79) the second neon tube 79 turns on. This provides a few microamps to the base of the transistor 70 and it turns on. When the transistor 70 turns on, the transistors 71 and 72 turn off thereby providing a signal to the base of the transistor 50 to turn the converter 30 off. When the output terminal voltage drops to approximately 330 volts (sustaining voltages of 240V and 90V), the transistor 70 turns off, the transistors 71-72 turn on, and the converter 30 is turned on.

The low battery voltage limiter circuit 74 detects the voltage across the +B line 38 and the common line 33. When this voltage drops to a predetermined low level (such as 6.75 volts, which indicates that the voltage of one of the Nicad batteries of the set 31 has reached approximately zero volts), this limiter circuit 74 turns off the converter 30. This minimizes the chances of battery cell reversal while the rechargeable batteries are in use (that is, during discharge) and thus can prevent the reversal of one or more cells of the battery 31.

The regulator amplifier 70-72 senses the relatively small current (a few microamps) when the positive terminal switch 16 is closed to thereby cause the converter 30 to turn off. In addition to the resistor 28, a diode 86 and resistor 88 are connected in series across the rechargable batteries 31 via lines 38 and 33. This provides a load of relatively high resistance across the batteries 31 to thereby slowly discharge them over an extended period of time (such as about 3–4 months). With the switch 16 closed, the converter 30 is turned off as noted above, and the shunt across the terminals 17 and 20 reduces the voltage on the contact 17 to about two volts which comes from the batteries 31 and not from the converter 30. Dashed lines 92 and 94 shown in FIG. 3 engaging the controls 17 and 20 represent the male electrical terminals of the HVP-1 which physically engage and electronically contact these contacts.

While a presently preferred embodiment of the present invention has been illustrated and described, modifications and variations thereof will be apparent to those skilled in the art given the teachings herein, and it is intended that all such modifications and variations be encompassed within the scope of the appended claims.

What is claimed is:

1. A high voltage battery pack for providing a relatively high voltage output for electronic devices such as electronic flash units and wherein the battery pack is engaged with the power unit when in use comprising
    battery converter circuit means for stepping up a low battery voltage and providing a high voltage across first and second electrical conductors,
    first terminal means connected to one of said conductors for providing an electrical output terminal for said pack, and
    second terminal means connected to the second of said conductors for providing a second output terminal of said pack, said first and second terminal means serving to provide a high voltage to electrical terminals of a power unit when the battery pack is engaged with the power unit, said second terminal means comprising switch means for connecting said second terminal means to said first terminal means through shunt circuit means when said second terminal means is disengaged from said power unit to turn off said battery converter circuit means and to shunt said first and second terminal means through said shunt circuit means.

2. A battery pack as in claim 1 wherein
    said second electrical terminal means comprises the positive terminal of said pack, and
    said shunt circuit means comprises a resistance connected between said switch means and said first terminal means.

3. A battery pack as in claim 1 wherein
    said battery converter circuit means comprises a plurality of rechargable batteries, a DC to DC converter connected to said batteries for stepping up the battery voltage of said batteries to said high voltage, and monitor circuit means responsive to the voltage across said first and second terminal means for turning on and off said converter to cause said converter to maintain said high voltage within predetermined limits.

4. A battery pack as in claim 3 wherein said shunt circuit means comprises a resistance connected between said switch means and said first terminal means, and said monitor circuit means being responsive to closure of said switch means to cause said converter to turn off.

5. A high voltage rechargeable battery pack for providing a relatively high voltage output for electronic devices such as electronic flash units and wherein the battery pack is engaged with the power unit when in use comprising battery converter circuit means for stepping up a relatively low battery voltage and providing a high voltage across first and second electrical conductors, first terminal means connected to one of said conductors for providing an electrical output terminal for said pack, second terminal means connected to the second of said conductors for providing a second output terminal of said pack, said first and second terminal means serving to provide a high voltage to electrical terminals of a power unit when the battery pack is engaged with the power unit, said second terminal means comprising switch means for connecting said second terminal means to said first terminal means through circuit means when said second terminal means is disengaged from said power unit to turn off said battery converter circuit means and to connect said first and second terminal means through resistance circuit means, and said battery converter circuit means comprises a plurality of rechargeable batteries, a DC to DC converter connected to said batteries for stepping up the battery voltage of said batteries to said high voltage, and monitor circuit means responsive to the voltage across said first and second terminal means for turning on and off said converter to cause said converter to maintain said high voltage within predetermined limits, and said monitor circuit means being responsive to closure of said switch means to cause said converter to turn off.

* * * * *